United States Patent [19]

Hammerstrom

[11] Patent Number: 4,983,962
[45] Date of Patent: Jan. 8, 1991

[54] NEURAL-MODEL, COMPUTATIONAL ARCHITECTURE EMPLOYING BROADCAST HIERARCHY AND HYPERGRID, POINT-TO-POINT COMMUNICATION

[76] Inventor: Daniel W. Hammerstrom, 19973 SW. Oak Ct., Aloha, Oreg. 97007

[21] Appl. No.: 95,941

[22] Filed: Sep. 14, 1987

[51] Int. Cl.⁵ .............................................. H04Q 9/00
[52] U.S. Cl. ........................... 340/825.02; 340/825.52; 370/94.1; 370/94.3; 370/85.13
[58] Field of Search ............... 340/825.02, 825.05, 340/825.52, 825.5; 370/88, 85, 112, 85.9, 85.12, 85.13, 85.14, 92, 94.1, 94.3; 364/131, 133, 135, 137, 602, 513, 917.95, 276.6, 929.232, 942.74

[56] References Cited

U.S. PATENT DOCUMENTS

| | | | |
|---|---|---|---|
| 3,287,703 | 11/1966 | Slotnick | 364/200 |
| 3,794,983 | 2/1974 | Sahin | 370/54 |
| 4,247,892 | 1/1981 | Lawrence | 364/200 |
| 4,347,498 | 8/1982 | Lee et al. | 340/825.02 |
| 4,660,166 | 3/1987 | Hopfield | 364/131 |
| 4,701,756 | 10/1987 | Burr | 340/825.02 |
| 4,719,591 | 1/1988 | Hopfield et al. | 364/807 |
| 4,731,784 | 3/1988 | Keller et al. | 370/88 |
| 4,752,906 | 6/1988 | Kleinfeld | 364/300 |
| 4,760,572 | 7/1988 | Tomikawa | 340/825.52 |
| 4,771,286 | 9/1988 | Niessen et al. | 340/825.52 |
| 4,796,199 | 1/1989 | Hammerstrom et al. | 364/513 |
| 4,797,882 | 1/1989 | Maxemchuk | 370/85.12 |
| 4,809,362 | 2/1989 | Claus et al. | 340/825.02 |

OTHER PUBLICATIONS

Sippl, "Data Communications Dictionary", Nov. 4, 1980, p. 321.

Primary Examiner—Donald J. Yusko
Assistant Examiner—Edwin C. Holloway, III
Attorney, Agent, or Firm—Kolisch, Hartwell, Dickinson, McCormack & Heuser

[57] ABSTRACT

A hybrid neural-model computational architecture which employs both broadcast hierarchical bus communication for high fan-out communication situations and point-to-point grid communication for low fan-out communication situations.

2 Claims, 1 Drawing Sheet

NEURAL-MODEL, COMPUTATIONAL ARCHITECTURE EMPLOYING BROADCAST HIERARCHY AND HYPERGRID, POINT-TO-POINT COMMUNICATION

BACKGROUND AND SUMMARY OF THE INVENTION

This invention pertains to a neural-model computational architecture structure, and more particularly, to such a structure which combines the significant advantages of a system employing broadcast hierarchy, as well as those of a system employing point-to-point, grid-bus communication.

In my U.S. Pat. No. 4,796,199, issued Jan. 3, for "NEURAL-MODEL, INFORMATION-HANDLING ARCHITECTURE AND METHOD", I have described a unique neural-model computational method and architecture structure which features broadcast hierarchy, and locality-of-communication dominance. This multi-communication-level system offers a unique organization of physical nodes and connection nodes which tends to maximize the capabilities and advantages of a neural-model, connectionist, computational network, through featuring a dominance of locality-of-communication performances in the way that connections (communications) take place.

The entire disclosure of that patent application is hereby incorporated herein by reference.

Another kind of computational architecture, which is not necessarily based on a neural-model, is one in which a grid structure interconnects the physical nodes to permit non-broadcast, point-to-point, go-to-address specific communication. Those skilled in this field of art are familiar with the well-known workings (hardware and software) associated with such systems.

The present invention proposes a unique marriage of these two kinds of systems in a manner which offers, in a unitary system, which is a neural-model connectionist system, the special and important advantages of both.

Explaining further, in the new kind of broadcast-hierarchical, neural-model system which I describe in my above-referred-to patent application, there is one kind of circumstance which is not well handled, strictly speaking, by a rigid implementation of broadcast hierarchy. In that system, locality-of-communication dominance is achieved by structuring the system in such a manner that each connection node has preferably all, or at least a very dominant portion, of its intended connections established as local connections which use the lowest communication level bus provided in the system. Connection nodes which are intended to communicate more frequently with more distant connection nodes broadcast, typically with somewhat less frequency, over a higher level bus. And, in the particular system described in that patent application, yet a third level of hierarchical communication is provided over a third, highest-level bus which accommodates the longest-distance node-to-node, typically low frequency, communication.

In that system, one requirement is that, in order properly to implement the broadcast feature, the bus level over which a particular connection node communicates is defined by the highest-level bus which it must employ for its longest-distance connection. Thus, somewhat of a problem arises where the architecture of a system results with a number of connection nodes having a predominance of low-level, short-distance connections, along with a few higher-level, longer-distance connections. These nodes, because they must broadcast over one of the higher-level buses during the relatively few times that they make long-distance connections, nevertheless occupy the time and territory of this higher-level bus for each and every one of the much more frequent lower-level communications. Thus, a situation exists which tends to diminish, somewhat, the efficiency which that system is capable of providing.

According to a preferred embodiment of the present invention, the marriage which was mentioned above results in the use of what is referred to herein as a hypergrid bus which, in most cases, and in the particular instance illustrated herein, is connected to each and every one of the physical nodes in a system like that described in my prior-referenced patent application. This hypergrid bus is a non-broadcast structure, and specifically takes the form of a plurality of point-to-point communication buses that extend in a grid fashion between selected, adjacent physical nodes. Through appropriate programming of the system, employing techniques which are well known to those skilled in the art, under a circumstance where a connection node, which may otherwise have a plurality of high-frequency, low-level connections to make, "desires" to make one or more of its intended longer-distance, non-local connections, the following occurs: the physical node associated with this connection node accesses the hypergrid bus (rather than any one of the broadcast-level buses), and employing go-to-addressing, and appropriate routing information, directs communication from this connection node to the specific, other, distant connection node with which it needs to communicate, or to any specific point in the system.

The advantages of the marriage should be immediately obvious to those skilled in the art. Nodes which have both high-frequency (local) and low-frequency (distant) connections (communications) to make, make the former on the appropriate broadcast bus, and the latter exclusively via the hypergrid bus. These advantages, and others which are offered by the combination proposed by the present invention, will become more clearly appreciated as the description which now follows is read in conjunction with the accompanying drawings.

DETAILED DESCRIPTION OF THE INVENTION

Figure 1:
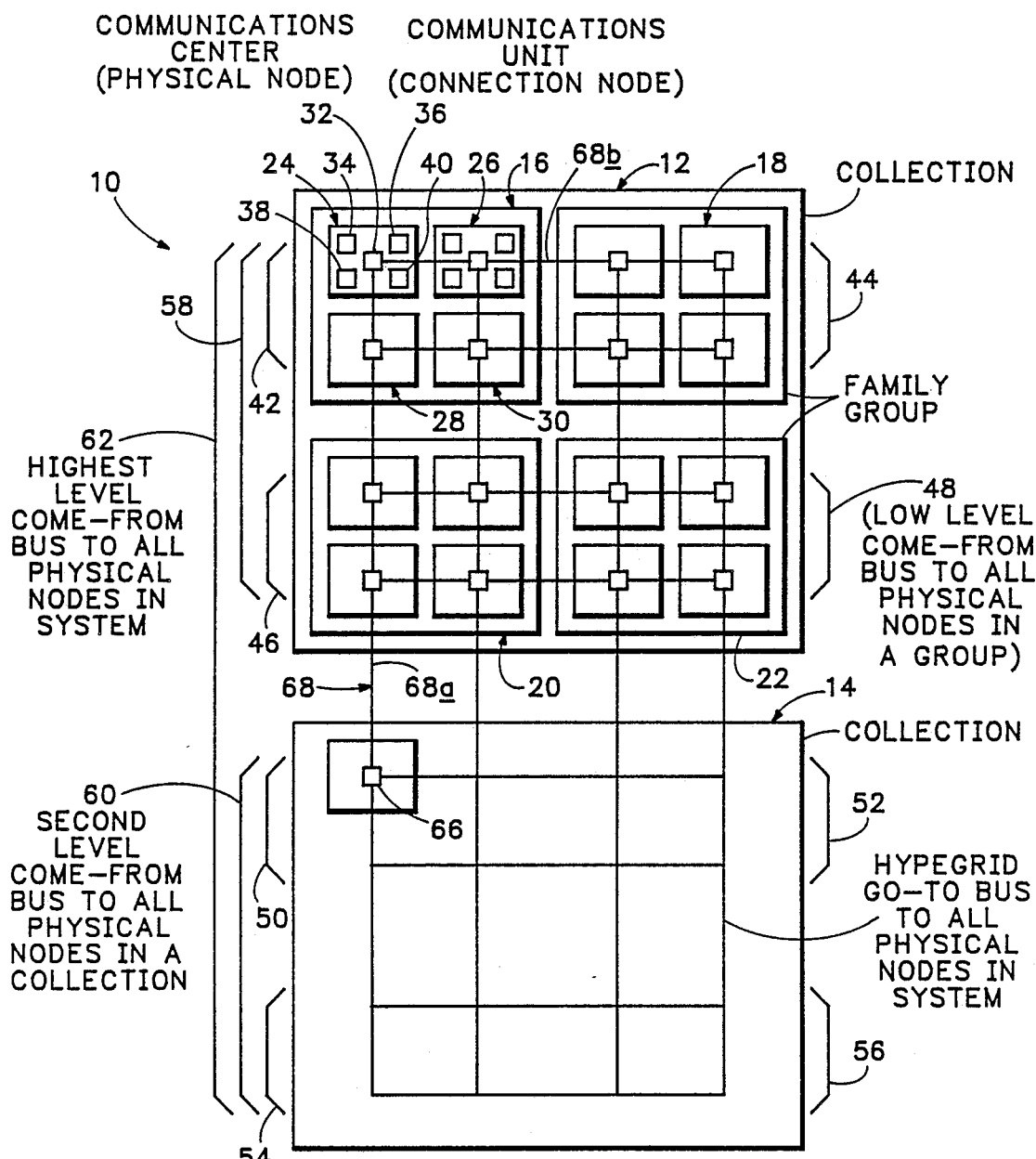
FIG. 1 is a schematic illustration of an information-handling architecture structure which embodies all of the broadcast-hierarchical, locality-of-communication-dominance features of the system described in my above-referred-to U.S. Pat. No. 4,796,199, and the hypergrid bus interconnecting all of the physical nodes in the system thus to operate combinational system which is the subject matter of the present invention.

Turning attention now to the two drawing figures, indicated generally at 10 is a computational system which is constructed in accordance with the present invention. System 10 is also referred to herein as a neural-model, broadcast-hierarchical, locality-of-communication-dominant, information-handling architecture structure. It will become apparent to the reader, in the description which now follows, that system 10, as disclosed herein, is displayed as a relatively simple system in order to promote an easy understanding of the architecture and the operation of the system. In actual practice, a real-life system will, as will be obvious to those skilled in the art, be far more extensive, in order to offer the practical capability of neural-model processing. Despite the simplicity, however, which has been chosen to illustrate system 10, all of the structural and operational principles of the invention are fully disclosed and implemented therein. Those skilled in the art will recognize immediately how these principles can be applied in the making and using of a large, real-life system. In reading the description which now continues, the reader should recall that I have incorporated by reference the entirety of the disclosure contained in the prior-filed patent which I have mentioned earlier in this writing. Accordingly, a full discussion of the various communication levels which are present in system 10, whose descriptions and whose operations, are detailed in the prior patent, are omitted from the text of this specification.

Progressing from a bird's-eye to a worm's-eye view of system 10, it includes two collections 12, 14 of physical nodes and connection nodes which are organized, within these collections, as will now be described. It should be explained that what are shown as the contents of collection 12 also exist, with the same layout and pattern, in collection 14, and that a description generally of the contents of collection 12 fully describes the like contents of collection 14.

Within collection 12 there are four subdivisions, also referred to as groups or as neighborhoods, 16, 18, 20, 22, within each of which are four further subdivisions, referred to as families, such as the families shown at 24, 26, 28, 30 in group 16.

Within each family, such as within family 24, are a physical node, or a communication center, such as node 32, and four connection nodes, or communication units, such as those shown at 34, 36, 38, 40. As has been suggested just above, vis-a-vis avoiding unnecessary complexity, family 24 is illustrated with only four connection nodes associated with node 32. In practice, node 32, as well as all of the other physical nodes in the system, would typically be associated with about one-thousand connection nodes.

As can be seen, the associated physical and connection nodes which appear in FIG. 1 are illustrated only with respect to families 24, 26. It should be understood, of course, that all of the other families present in system 10 have the same internal structures. And, while such is true for the system now being described, it should be understood further that different physical nodes in a system may be associated with different numbers of connection nodes in a particular architectural implementation.

Figure 2:
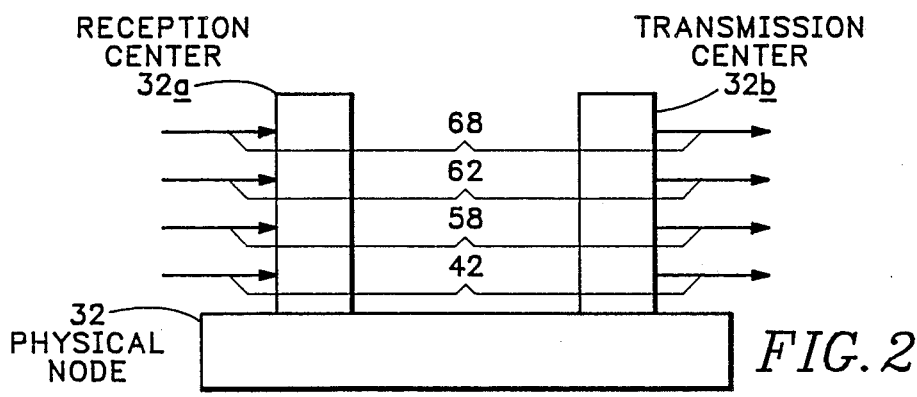
FIG. 2 illustrates the connection of the various busses to a communication center of the invention.

The simplification of FIG. 2 referred to earlier is one in which only the physical nodes in collections 12, 14 are illustrated (and only fragmentarily in collection 14). Thus, physical node 32 appears near the upper left corner as a small rectangle within collection 12, and it will be understood that all of the other small rectangles shown in this collection, and the three shown in fragmented collection 14, represent the other physical nodes in system 10.

Describing generally the hierarchical nature of system 10, in the particular system shown there are three information-handling, or communication, levels. The number of such levels is dictated by the fact that the physical and connection nodes are organized herein in three different kinds of assemblies—collections, groups and families, as mentioned earlier. A hierarchical system exists, of course, whenever there are two or more communication levels. A three-level system has been chosen here for illustration purposes.

Considering the communication broadcast aspects of system 10, for each level of communication, there is a specific bus structure which allows communication from a given connection node to be broadcast throughout the relevant portion of that level, which broadcast is "listened-to" by all of the physical nodes which are connected to that bus structure. Each physical node in the system is connected to all three levels of bus structure in order to be aware (for reception/communication purposes) of all incoming communications, and to be prepared to transmit an outgoing communication when required.

At 42, 44, 46, 48 in FIG. 1 there are shown four brackets which symbolize a first, low-level bus structure (communication level) for each of groups 16, 18, 20, 22, respectively. All of the physical nodes in group 16 are connected to bus 42; all of the physical nodes in group 18 are connected to bus 44; and so on.

This organization is illustrated in somewhat more detail, and on a larger scale than has been used for FIG. 1 herein, in FIG. 2 of the above-referred-to, prior-filed patent application.

At 50, 52, 54, 56 in FIG. 1, are four brackets which symbolize, for the groups in collection 14, the same first, low-level bus structure which has just been described for the groups in collection 12.

At 58, 60 in FIG. 1, are two brackets which symbolize a second, higher-level bus structure (communication level), with bus 58 being associated with collection 12, and bus 60 being associated with collection 14. Bus 58 is connected to all sixteen of the physical nodes in collection 12, and bus 60 is connected to all sixteen of the physical nodes in collection 14. FIG. 3 in the referenced prior-filed patent application illustrates this situation in greater detail.

Symbolized by a bracket 62 in FIG. 1 is a bus, or bus structure (communication level), which links collections 12, 14. This, in system 10, is the highest-communication-level broadcast bus structure. A somewhat more detailed showing of bus 62 appears in FIG. 4 in the prior-filed patent application. Bus 62 is connected to all of the physical nodes within system 10.

Indicated at 64 in FIG. 1 is another family in system 10, which family happens to reside in collection 14 in a "location" which corresponds to that of family 24 in collection 12. Residing within family 64 is a physical node 66. The reason for introducing a single family within group 14, and that family's associated physical node, is to aid in an understanding of what is shown in FIG. 2.

On the buses so far described in system 10, communication throughout the system takes place by way of broadcast, using "come-from" addressing to identify the communicating connection node. This pattern of communication is fully described and illustrated in my prior-filed patent, incorporated by reference herein.

This broadcast-type communication is characterized by what is known as locality-of-communication-dominance, whereby the nodes which communicate with one another most frequently are coupled preferentially over the lowest-level bus, those that communicate less frequently on the intermediate-level bus, and those with the lowest frequency of communication on the highest-level broadcast bus.

As was mentioned earlier herein, in the preamble portion of this specification, it may well be the case that a given connection node which has a high frequency of communication, and which can be localized with its communicating partners for operation on the lowest level bus, may also have one or more longer-distance communications which, in the absence of the present invention, would require that it always operate, and occupy unnecessary time, on one of the higher-level buses.

To take care of this situation, proposed according to the present invention is yet another bus or bus structure, referred to herein also as a hypergrid bus, which is shown generally at 68 in FIG. 2. Bus 68 is connected to all of the physical nodes in system 10, and several of these nodes are shown in FIG. 2, with previously mentioned physical nodes 32, 66 being pointed out specifically. In system 10, bus 68 is made up of a plurality of bus runs, such as the two shown at 68a, 68b, which extend in a point-to-point fashion between selected, adjacent physical nodes.

The system proposed by this invention, which is a hybrid by nature, uniquely combines the positive efficiencies of broadcast hierarchical and point-to-point networks. The former is most efficient with so-called high fan-out communication situations, and least efficient with low fan-out communication. The latter exhibits just the reverse characteristic. Thus, the proposed hybrid marries the best of the two. With, as is always the case in a given physical system, a fixed communication capacity (physical), the hybrid allocation of this fixed capacity to both broadcast hierarchical and point-to-point communication offered by the present invention maximizes the use of the "physical real estate" available.

In system 10, when a long-distance communication is required from one connection node to another, where the communicating connection node is also one that preferably will use the lowest-level bus structure, its communications are handled on a point-to-point basis over bus structure 68, employing go-to addressing. In the field of computer architecture, the employment of a grid bus to handle point-to-point, go-to-address communication is well known to those skilled in the art, as are the programming and structural techniques required to implement such communication. Put another way, those skilled in the art will recognize immediately how to implement, in the otherwise broadcast-hierarchical nature of system 10, a hypergrid bus, such as bus 68, to handle the potentially troublesome long-distance communications.

By way of a simple illustration, let us assume that within family 24, previously mentioned connection node 34 (see FIG. 1) is intended to communicate predominantly with the connection nodes in the other families in group 16. Let us also assume that node 34 is intended, on a very infrequent basis, to communicate with a connection node in family 64. In the absence of hypergrid bus 68, it would be necessary that every communication from node 34 take place in a broadcast fashion over the highest-level bus in the system, bus 62. The inefficiency of such a situation is obvious.

However, with system 10 structured according to the invention (including bus 68), all of the communications from node 34 which are made to nodes within group 16 take place in a broadcast fashion over low-level bus 42.

A communication which is made to a node in family 64 takes place in a non-broadcast fashion, and more specifically in a point-to-point, go-to-address fashion, via routing over bus 68. The information which is communicated by node 34's physical node 32 is conventionally structured to achieve appropriate routing to physical node 66, and thence to the designee connection node which is associated with node 66. Such a point-to-point broadcasting and routing technique is one which is well known to those skilled in the art.

From the description which has just been given, it should be apparent how the marriage of the broadcast-hierarchical system which is disclosed in my above-referred-to, prior-filed patent application, with a point-to-point, go-to-address-only, hypergrid bus, such as bus 68, according to the invention, offers significant performance advantages.

While a preferred embodiment of the invention has been described herein, I recognize that various changes and modifications may be made to accommodate different computational requirements. For example, it is not absolutely necessary that a hypergrid bus connect with all of the physical nodes in an otherwise hierarchical, broadcast-type architecture. Such a bus need only be present to handle that portion of the architecture wherein the short-distance/long-distance bus competition possibility presents a problem.

With regard to the term "broadcast hierarchy", etc., various implementations other than the specific one shown herein may be used. For example, a hierarchical network can exist with overlapping broadcast regions.

The term "grid" used herein is intended not only to cover a two-dimensional arrangement such as the one illustrated and described, but also other multi-dimensional organizations. Also, the term "grid" is intended to encompass any kind of implementable point-to-point communication connection system.

Certainly, other kinds of specific modifications may be made to suit other considerations, and all of these variations and modifications may take place without departing from the spirit of the invention.

It is claimed and desired to secure as letters patent:

1. A neural-model, broadcast-hierarchial-capable, locality-of-communication-dominant, information-handling architecture structure comprising
plural communication centers organized into plural information-handling collections of communication centers, including at least plural information-handling families, which are organized into plural information-handling groups, said communication centers within each family being connected to a first information-handling level, and said communication centers within each group being connected to a second information-handling level, each level including a broadcast communication bus connected to said communication centers, which bus is specific to its level, communication within said levels taking place over said buses only by way of broadcast, come-from addressing, and
a third communication level including a hypergrid bus connected to said communication centers enabling long-distance, non-broadcast, point-to-specific-point, go-to-address-only communication between such centers exclusively via said hypergrid bus.

2. A neural-model, broadcast-hierarchial, locality-of communication-dominant, information-handling architecture structure comprising a first information-handling level, including plural information-handling families, organized into plural groups of such families, with each family in each group including at least two communication units and an associated communication center for communicating via a first level communication bus, directly on said first level, only with its family-associated units and with the communication centers in the other families in the same group, thus to enable broadcast, come-from addressing communication, and simultaneous cooperative information handling, between different, respective, selected units in the families in the group, at least one other, higher-level, information handling level, including means operatively communicative directly with said communication centers in the families in said first level for enabling the selective broadcast communication of information between different centers in the different groups via a second level communication bus, thus to accommodate broadcast, come-from addressing communication, and simultaneous cooperative information handling, between selected units in the families in different groups which share said first level, and a high-level, information handling level, including a hypergrid bus connected to said communication centers enabling long-distance, non-broadcast, point-to-specific-point, go-to-address-only communication between such centers exclusively via said hypergrid bus.

* * * * *